United States Patent [19]

Lee

[11] 4,026,248

[45] May 31, 1977

[54] ARRANGEMENT FOR STABILIZATION OF FLOW IN A REACTION CARBURETOR

[75] Inventor: Wenpo Lee, Wolfsburg, Germany

[73] Assignee: Volkswagenwerk Aktiengesellschaft, Wolfsburg, Germany

[22] Filed: July 11, 1975

[21] Appl. No.: 594,969

Related U.S. Application Data

[63] Continuation of Ser. No. 429,624, Dec. 28, 1973, abandoned.

[52] U.S. Cl. .................................. 123/3; 48/212
[51] Int. Cl.² .................................. F02B 43/08
[58] Field of Search ............... 123/119 E, 1 A, 3; 23/288 F, 288 FC, 288 FB, 277 C; 48/212

[56] References Cited

UNITED STATES PATENTS

| | | | |
|---|---|---|---|
| 2,632,296 | 3/1953 | Houdry | 123/119 E |
| 3,635,200 | 1/1972 | Rundell et al. | 123/3 |
| 3,719,457 | 3/1973 | Nagamatsu | 23/288 FC |
| 3,754,870 | 8/1973 | Carnahan et al. | 23/288 FC |
| 3,780,772 | 12/1973 | Carnahan et al. | 23/288 FC |
| 3,785,781 | 1/1974 | Hervert et al. | 23/288 FB |
| 3,828,736 | 8/1974 | Koch | 123/3 |

Primary Examiner—C. J. Husar
Assistant Examiner—David D. Reynolds
Attorney, Agent, or Firm—Brumbaugh, Graves, Donohue & Raymond

[57] ABSTRACT

A reaction carburetor for an internal combustion engine which operates to catalytically convert fuel from the liquid to the gaseous state for improved combustion. According to the invention, means are provided for stabilizing the flow of fuel and air in the carburetor. The stabilizing means include at least one temperature-stable body, arranged in the fuel-air flow path ahead of the catalyst, having a plurality of flow channels extending therethrough in the direction of the flow path.

5 Claims, 3 Drawing Figures

ARRANGEMENT FOR STABILIZATION OF FLOW IN A REACTION CARBURETOR

This is a continuation of application Ser. No. 429,624, filed Dec. 28, 1973, now abandoned.

BACKGROUND OF THE INVENTION

The present invention relates to an arrangement for stabilizing the flow of the fuel-air mixture in a carburetor. More particularly, this invention concerns the stabilization of flow in a reaction carburetor of the type containing one or more catalysts for the catalytic conversion of liquid into gaseous fuel.

A known technique for reducing the emission of noxious substances in the exhaust gases of internal conbustion engines consists in supplying the fuel needed for combustion in gaseous form. In comparison to internal combustion engines operated on liquid fuel, engines which are provided with a proper mixture of air and gaseous fuel are capable of complete combustion independently of the engine operating condition. This improved combustion is due to the fact that the gaseous fuel remains in the gaseous aggregate condition even at low temperatures. Thus, for example, during a cold start of the internal combustion engine, condensation will not form on the cold cylinder walls as is the case with internal combustion engines operating on liquid or vaporized fuel.

In view of the difficulty and expense of carrying gaseous fuel on vehicles, even in the form of gases that are liquefied under pressure, it has already been proposed that the gaseous fuel required for combustion be prepared in a reaction carburetor on the intake side of an internal combustion engine by catalytic and thermal reaction from the liquid fuel customarily used in internal combustion engines. In a reaction carburetor, a mixture of air and partially vaporized liquid fuel (or of air, exhaust gases and liquid fuel) flows through one or more catalysts arranged in series in which the liquid or vaporized fuel is converted at higher temperatures (e.g., 200° to 1,000° C, depending upon the catalyst used) into gaseous fuel by partial combustion. Complete combustion is avoided, in part due to a lack of a sufficient quantity of air.

In reaction carburetors of this kind, there is a danger that the sensitive catalysts will be locally overheated, and thereby destroyed, through flame formation. The generation of flames in the fuel-air mixture is determined at high temperatures essentially by the flow condition. For example, a turbulent or uneven flow leads to flame formation whereas the generation of flames can be prevented if a laminar flow profile is maintained within the carburetor.

SUMMARY OF THE INVENTION

It is a principal object of the present invention to provide an arrangement for stabilizing the flow of the fuel-air mixture in a reaction carburetor of the type described above, thus insuring a laminar flow of the fuel-air mixture before it reaches the catalyst or catalysts.

The above object, as well as other objects which will become apparent from the discussion that follows, are achieved, according to the present invention, by inserting at least one body in the throat of the reaction carburetor at a point preceding the catalyst or catalysts. This body, which is thus arranged in the path of flow of the fuel-air mixture, is provided with a plurality of flow channels extending therethrough to control and direct the mixture flow. The body should be made of a material that is unaffected by temperature changes and may be designed and constructed in a manner similar to the carrier bodies, used in catalytic afterburners, for holding catalytically effective layers. The axially extending flow channels, which may be made comparatively narrow, result in the formation of a laminar flow profile in the fuel-air mixture delivered to the catalyst layers, thus suppressing harmful flame formation.

In accordance with a particular feature of the present invention, the body described above is made of a ceramic material having a high wetting ability for liquid fuel. Such a material advantageously causes the portion of the fuel-air mixture which has not been vaporized to be largely absorbed by the body, thereby preventing undesirable soot formation on the surface of the catalysts. A better and more uniform distribution of the fuel in the fuel-air mixture is also achieved, thus improving the operation of the reaction carburetor.

In accordance with a preferred embodiment of the invention, the body is made essentially of a ceramic, aluminum silicate-fiber material. This material exhibits high stability against charges in temperature and has a high wetting ability for liquid fuel. The material can also be worked well and is comparatively moderate in cost.

Particular economic and production advantages may be obtained if the body is constructed as an essentially cylindrical molded element, with the flow channels stamped out in its axial direction.

DESCRIPTION OF THE PREFERRED EMBODIMENT

Figure 1:
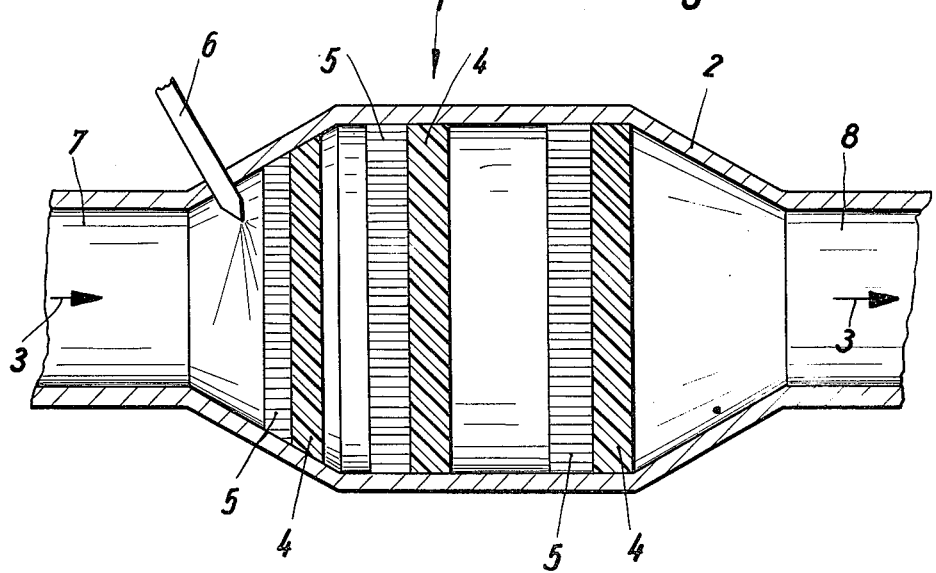
FIG. 1 is a longitudinal, cross-sectional view of a reaction carburetor incorporating flow stabilizing means according to the present invention.

The preferred embodiment of the present invention will now be described in connection with FIGS. 1 and 2 of the drawing.

In FIG. 1 there is shown a reaction carburetor 1 comprising a housing 2, for example of circular cross-section, and one or more catalysts 4 for the catalytic conversion of liquid into gaseous fuel. The direction of flow through the reaction carburetor is indicated by the arrows 3.

Figure 2:
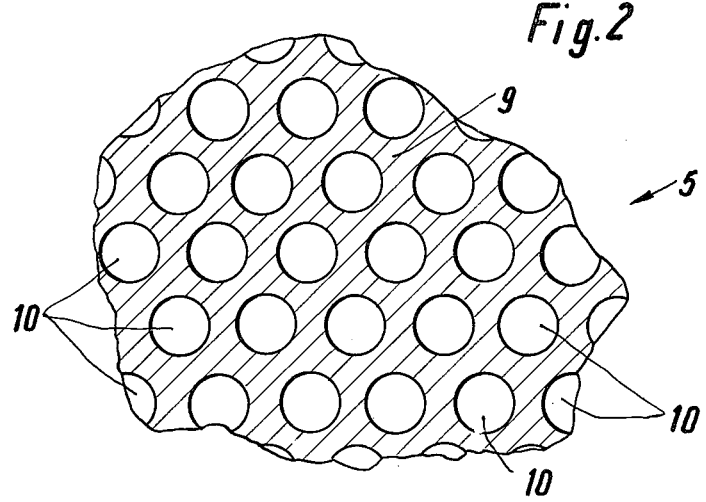
FIG. 2 is a cross-sectional view of the flow stabilizing means employed in the carburetor of FIG. 1.

According to the present invention, the catalysts 4 are preceded by flow stabilizing bodies 5 which, as shown in greater detail in FIG. 2, may consist of a ceramic material 9 that is traversed by a plurality of flow channels 10 extending in the direction of fuel-air flow.

Figure 3:
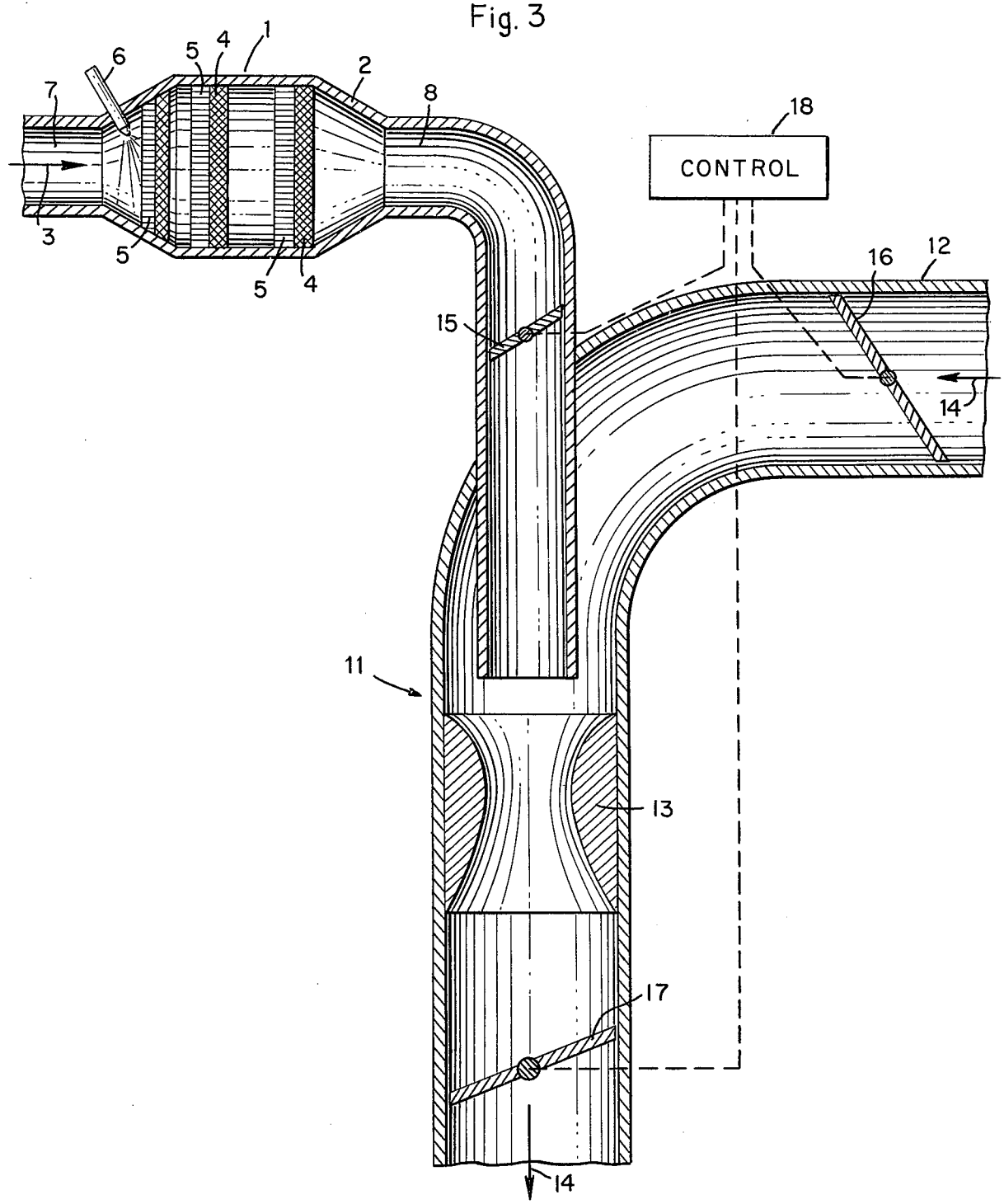
FIG. 3 is a longitudinal, cross-sectional view of the reaction carburetor of FIG. 1 and a device for mixing the gases produced thereby with fresh air.

Fresh air (or mixture of fresh air and exhaust gases) is supplied to the intake side 7 of the reaction carburetor 1. Liquid fuel, as finely divided as possible, is added to the air or the air-exhaust gas stream by means of a device 6, such as an injection nozzle. The fuel-air mixture thus obtained is conducted through the catalysts 4 wherein the fuel in liquid or vaporized form is catalytically converted into a gas. The mixture flowing out of the discharge side 8 of the reaction carburetor 1, which consists primarily of gaseous fuel, is then delivered to a mixing device (FIG. 3) which inserts additional fresh air into the gaseous stream, and ultimately to the combustion chambers of an internal combusion engine. In the mixing device 11 the gases discharged from the reaction carburetor 1 are supplied to an air suction tube 12 immediately ahead of a venturi arrangement 13. Fresh air flows through the air suction tube 12 in the direction of the arrow 14. Butterfly valves 15, 16 and 17 are arranged within the mixing device 11 to control the gas stream, air stream and the air-gas mixture, respectively. These butterfly valves are coupled, as indicated by the dashed lines, for common actuation by a control device 18.

Depending upon the type of catalysts used in the reaction carburetor, the conversion of liquid into gaseous fuel will take place at temperatures ranging from 200° to 1,000° C.

Catalysts for effecting this conversion are described for example, in German published applications 2,210,365, 2,210,401 and 2,210,438 which are corporated herein by reference.

The flow stabilizing bodies 5 preceding the catalysts 4 in the fuel-air flow path serve, in the first instance, to maintain a laminar flow profile in the fuel-air mixture conducted to the catalysts so that flame formation, that would be stimulated by a turbulent flow, is effectively suppressed. To that purpose the flow stabilizing bodies 5 may be designed and constructed like the monolithic carrier bodies, used in catalytic afterburners, for holding catalytically effective layers. Such carrier bodies are well known and described in the U.S. Pat. No. 3,441,381 which is corporated herein by reference.

In addition, if the flow stabilizing bodies 5 are made of a material having a high wetting ability for liquid fuel, they will absorb the excess liquid fuel which has not evaporated, thus effectively preventing soot formation on the surface of the subsequent catalysts 4. At the same time, the flow stabilizing bodies 5 which are wetted by the fuel will cause the distribution of fuel to be more uniform in the fuel-air mixture. This improvement in mixture formation results in the production of a larger quantity of gaseous fuel in the reaction carburetor.

In a preferred embodiment of the present invention, the flow stabilizing body or bodies 5 are made essentially of a ceramic, aluminum silicate-fiber material. This ceramic material is available under different trade marks, for example under "Fiberfrax" or "Kaowool", and in many product forms. The preferred product form for the flow stabilizing body or bodies 5 are vacuum-formed shapes.

Flow stabilizing bodies made of ceramic, aluminum silicate-fiber material may be formed, by means of well-known vacuum casting methods, into any desired shape and cross-section, thus facilitating production regardless of the shape of the cross-section of the catalysts. It is therefore possible to design and construct the flow stability bodies in a circular, oval, rectangular or polygonal form, in dependence upon and in accordance with the subsequently arranged catalysts.

If the reaction carburetor is provided with a plurality of catalysts 4 arranged in series, such as is shown in FIG. 1, it is possible to arrange a flow stabilizing body 5 in the carburetor immediately preceding each catalyst 4. However, it may also be sufficient to arrange one such flow stabilizing body in the carburetor throat proceding the first catalyst only, or preceding a portion of the catalysts.

As mentioned above, each flow stabilizing body may be cast as a solid piece of the desire shape and the flow channels subsequently created by punching or stamping them out in the axial direction. It is also possible to form these channels during the casting process by providing suitable cores in the casting mold, or by some other means. In any case, the flow stabilizing bodies in accordance with the present invention can be produced in a comparatively simple manner without large expenditure and without limitation to any particular cross-sectional shape.

The present invention has now been described with reference to a particular preferred embodiment. It will be understood that this embodiment is susceptible to various changes, modifications and adaptations as will occur to those skilled in the art. It is therefore intended that the scope of the present invention be limited only by the following claims.

I claim:
1. In a reaction carburetor, containing at least one catalyt arranged in the flow path of a fuel-air mixture, for catalytic conversion of fuel from the liquid to the gaseous state, the improvement comprising means for stabilizing the flow in said carburetor, said stabilizing means including at least one temperature-stable, non-catalytically active body arranged in the said flow path immediately ahead of said catalyst and having a plurality of flow channels extending therethrough in the direction of said flow path and of sufficient length to create substantially laminar flow of said fuel-air mixture.

2. The improvement defined in claim 1, wherein said body is made essentially of a ceramic material having a high wetting ability for liquid fuel.

3. The improvement defined in claim 1, wherein said body is made essentially of a ceramic, aluminum silicate-fiber material.

4. The improvement defined in claim 1, wherein said body is essentially cylindrically shaped with said flow channels formed in its axial direction, the cross-section of said cylindrical body corresponding to the cross-section of said catalyst.

5. The improvement defined in claim 1, wherein said body is molded and said flow channels are stamped therein.

* * * * *